United States Patent [19]
Sakai et al.

[11] Patent Number: 5,128,209
[45] Date of Patent: Jul. 7, 1992

[54] COMPOSITE GASKET MATERIAL

[75] Inventors: Yakichi Sakai, Hamamatsu; Ikuo Yamagiwa, Ashiga; Masayuki Aso, Yokohama, all of Japan

[73] Assignee: Japan Gore-Tex, Inc., Tokyo, Japan

[21] Appl. No.: 717,954

[22] Filed: Jun. 20, 1991

[30] Foreign Application Priority Data

Jun. 25, 1990 [JP] Japan .................. 2-166269

[51] Int. Cl.⁵ .................. B32B 3/00; B32B 5/16; B32B 9/00
[52] U.S. Cl. .................. 428/421; 428/315.5; 428/315.9; 428/408; 428/422; 428/463
[58] Field of Search ............ 428/408, 422, 463, 315.9, 428/315.5, 421

[56] References Cited

U.S. PATENT DOCUMENTS

| | | | |
|---|---|---|---|
| 4,888,245 | 12/1989 | Witzko | 428/422 |
| 4,961,991 | 10/1990 | Howard | 428/422 |
| 4,973,516 | 11/1990 | Yamaoka et al. | 428/408 |

FOREIGN PATENT DOCUMENTS 3638701 4/1989 Fed. Rep. of Germany.

Primary Examiner—William J. Van Balen
Attorney, Agent, or Firm—Gary A. Samuels

[57] ABSTRACT

Composite gasket materials comprising one or more layers of porous fluoropolymer film laminated to one or more layers of expanded-graphite sheet, or a subassembly of one or more layers of expanded-graphite sheet laminated to metal sheet. The composite gasket materials are suitable for use in many applications where asbestos-containing materials are used.

6 Claims, 1 Drawing Sheet

COMPOSITE GASKET MATERIAL

FIELD OF THE INVENTION

This invention relates to composite gasket materials having at least two layers in their construction and, more particularly, to composite gasket materials comprising at least one porous fluoropolymer layer and at least one expanded-graphite layer.

BACKGROUND OF THE INVENTION

Historically, for many applications requiring high chemical and temperature resistance, asbestos-containing gaskets have been used in the automotive, marine, chemical, machine and other industries. Due to current health and environmental concerns relating to asbestos, its use has been significantly reduced and other materials sought for these applications.

One such material is expanded-graphite, also known as graphite foil or flexible graphite. Expanded-graphite sheet is made by treating natural graphite with an acid mixture such as concentrated sulfuric acid and nitric acid or concentrated sulfuric acid and hydrogen peroxide and then, by rapidly heating the treated graphite to the decomposition temperature of the acid mixture the graphite expands up to 200 times its initial thickness. After the graphite has been expanded it can be flattened into a uniform sheet by pressing, rolling, or other such process.

Expanded-graphite sheet has many properties that make it desirable as a gasket material. It has excellent chemical resistance and can be used in almost any fluid, with the exception of strongly oxidizing fluids. It can be used over a very broad temperature range; $-270°$ C. to $3650°$ C. in an oxygen-free atmosphere or up to $600°$ C. in air. It has low creep relaxation, low permeability to liquids and gases, and has good resilience, conformability and flexibility properties. Also, it is anisotropic with respect to thermal conductivity, thermal expansion, and electrical conductivity. However, it has a serious drawback in that it is a weak and fragile material and must be frequently used in a composite form with a metal support structure.

Polytetrafluoroethylene (PTFE) and other fluoropolymers also have many good mechanical and chemical properties that make them desirable as a gasket material. Polytetrafluoroethylene is tough and flexible even at extremely low temperatures. It has a broad use-temperature range; from $-200°$ C. to $260°$ C. It has excellent resistance to chemicals and is stable to all acids, alkalis, and organic chemicals. It is only slightly attacked by molten alkali metals and by fluorine, chlorine trifluoride, etc., at high temperatures. It has excellent frictional properties, particularly at low speeds and with high loads, having coefficient of friction values in the range 0.04 to 0.06. It also has exceptional non-stick or release properties so that it does not readily adhere to other materials. The non-stick properties are advantageous to its use as a gasket but are a serious drawback when its attachment to another material is desired. Further drawbacks associated with fluoropolymers are that they exhibit high creep relaxation and have almost no resilience.

SUMMARY OF THE INVENTION

This invention overcomes the deficiencies of the above-described materials by combining them to form a novel composite gasket material wherein the drawbacks associated with one of the materials are compensated for by combination with the other material.

This is accomplished by laminating porous fluoropolymer film to expanded-graphite sheet. The porous fluoropolymer film imparts strength, toughness, tear resistance and handleability to the composite gasket material while at the same time, due to the relatively small amount of the fluoropolymer film in the construction, the effects of its negative attributes are reduced and the low creep relaxation and resilience of the expanded-graphite become dominant in the construction.

Specifically, this invention provides a composite gasket material comprising at least one layer of porous fluoropolymer film laminated to at least one layer of expanded-graphite sheet or, alternatively, a composite construction comprising at least one layer of porous fluoropolymer film laminated to at least one layer of a subassembly comprising at least one layer of expanded-graphite sheet laminated to a metal sheet.

DESCRIPTION OF THE INVENTION

Figure 1:
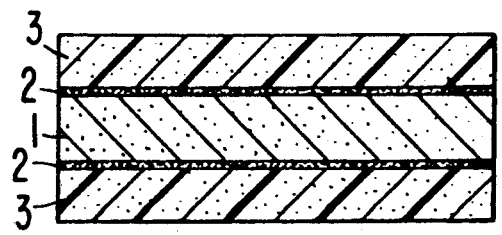
FIG. 1 is a cross-sectional views of one laminate of the invention.

Assembly of the composite gasket material of the invention can best be understood by referring to the drawings.

The embodiment of the invention shown in FIG. 1 is constructed by laminating a porous fluoropolymer film 3 to both surfaces of an expanded-graphite sheet 1 with an adhesive 2.

In the manufacture of expanded-graphite sheet, surface irregularities are created which are reduced in extent and magnitude by employing a flattening process which increases the density of the expanded-graphite sheet toward its theoretical maximum of 2.2 g/cc and produces an increasingly fine surface structure. The remaining surface irregularities provide anchoring sites for an adhesive and thus promote adhesion to the surface of the sheet. The density of the expanded-graphite sheet of the invention is preferably between 0.75 g/cc and 1.5 g/cc.

The thickness of the expanded-graphite sheet 1 in the composite gasket material is determined by end use considerations such as the number and size of bolts, fluid pressure and temperature, seal area, flange design and materials, etc. The thickness of the expanded-graphite sheet is typically between 0.1 mm and 3.0 mm although greater thicknesses can be used without difficulty.

The porous fluoropolymer film 3 of the invention can be made by a number of processes known in the art including stretching, expanding, foaming, leaching, and other mechanical processes. The fluoropolymer films typically have a thickness of 5 to 150 micrometers, preferably 5 to 50 micrometers; a pore volume of 25 to 95 percent, preferably 50 to 90 percent; and a nominal pore size of 0.05 to 15 micrometers, preferably 0.05 to 3 micrometers.

Films having these characteristics have a porous surface structure that provides anchoring sites for the adhesives thus making it possible to adhesively bond the fluoropolymer film 3 to the surface of the expanded-graphite sheet 1. Preferred fluoropolymer films are porous expanded polytetrafluoroethylene films manufactured according to the methods described in U.S. Pat. Nos. 4,187,390 and 4,953,566.

The adhesive 2 used in laminating the porous fluoropolymer film 3 to the expanded-graphite sheet 1 may be selected from many known in the art according to end use considerations. Suitable adhesives may be found in, but not limited to, the classes consisting of thermoplastics, thermosets or reaction curing materials. The adhesives may be applied in liquid form, for example, by spraying, coating or printing methods or, may be applied in solid form, for example, by interposing the adhesive as a powder, film or non-woven web between the layers to be laminated. After application of the adhesive a further step such as heating, pressing or a combination of heat and pressure may be used to complete lamination of the materials. The amount of adhesive in the construction is typically not more than 10 percent or, preferably not more than 5 percent of the total volume of the construction. If the amount of adhesive in the construction is greater than 10 percent its performance as a gasket may be reduced.

Figure 2:
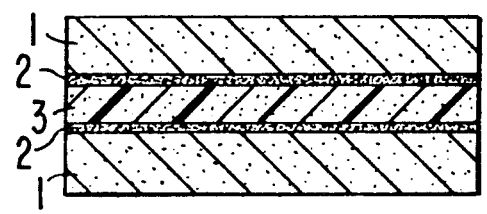
FIG. 2 is a cross-sectional view of another laminate of the invention.

Another embodiment of the invention, shown in FIG. 2 was constructed by laminating two expanded-graphite sheets 1 to each surface of a porous fluoropolymer film 3 with adhesive 2.

Figure 3:
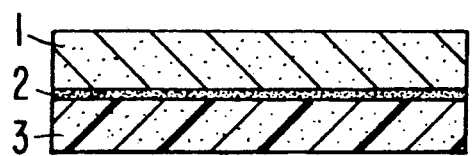
FIG. 3 is a cross-sectional view of still another laminate of the invention.

FIG. 3 shows another embodiment of the invention constructed by laminating a porous fluoropolymer film 3 to one surface of an expanded-graphite sheet 1 with an adhesive 2.

Figure 4:
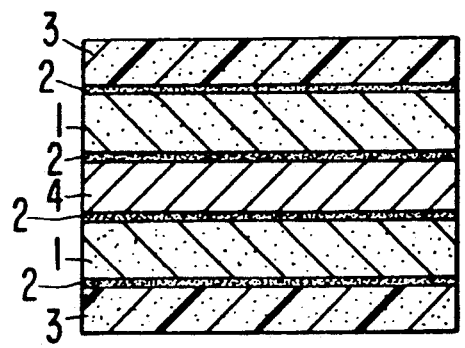
FIG. 4 is one more cross-sectional view of a laminate of the invention.

FIG. 4 shows another embodiment of the invention constructed by laminating expanded-graphite sheets 1 to both surfaces of a metal sheet 4 with an adhesive 2, and then laminating porous fluoropolymer films 3 to the outer surfaces of each of the expanded-graphite sheets 1.

The metal sheet 4 of the layered gasket construction can be iron, copper, stainless steel, or other suitable metal and is typically 0.1 mm to 0.8 mm thick or, preferably 0.1 mm to 0.3 mm thick. The metal core sheet may also be shaped to enhance sealability of the gasket construction, for example, by stamping or otherwise forming a bend in it.

EXAMPLE 1

Composite gasket material according to the present invention was made by laminating a porous expanded polytetrafluoroethylene film to both surfaces of an expanded-graphite sheet with a thermoplastic adhesive. The porous expanded polytetrafluoroethylene film had a thickness of about 40 micrometers, a pore volume of about 80 percent, and a nominal pore size of about 0.2 micrometers. The expanded-graphite sheet had a thickness of about 1 mm and a density of about 1 g/cc.

A gasket to fit a sport-motorcycle engine was made from the composite gasket material and placed between the cylinder assembly and engine block for testing. The gasket was clamped in place using 14 bolts, each adjusted with a torque wrench to provide a bolting force of 80 kg-cm before testing. The gasket was tested by subjecting it to 20 repetitions of the following protocol.

The engine was operated for 5 minutes at 6,000 rpm under a torsional load of 10 kg-m followed by 25 minutes operation at 12,000 rpm under a torsional load of 13 kg-m after which it was shut off and allowed to cool for 40 minutes. Oil temperature (in the engine pan) was $135 \pm 5°$ C.; engine cooling water temperature was 80° C. and regular gasoline was used as engine fuel.

After testing, gasket performance was evaluated by determination of the average bolting force retention ratio and visual examination for oil leaks. Bolting force retention ratio is determined by the following formula:

Bolting Force Retention Ratio (%) =

$$\frac{\text{Bolting Force after testing}}{\text{Bolting Force before testing}} \times 100$$

A high bolting force retention ratio is a very desirable attribute for gasket materials.

Test results of the gasket described above show that there was no oil leakage during the test and that the bolting force retention ratio was 75.8%. For comparison purposes, the table below shows these results in addition to test results of gaskets made from 5 commercially available asbestos-containing materials tested under the same conditions.

TABLE

|  | Gasket of the Invention | Comparative Gaskets | | | | |
| --- | --- | --- | --- | --- | --- | --- |
|  |  | A | B | C | D | E |
| Bolting Force Retention Ratio % | 75.8 | 61.4 | 40.0 | 36.6 | 27.7 | 59.8 |
| Oil Leakage | No | No | Yes | Yes | No | No |
| Evaluation | Excellent | Fair | Fair | Fair | Fair | Fair |

We claim:

1. A composite gasket material comprising at least one layer of porous fluoropolymer film laminated to at least one layer of expanded-graphite sheet.

2. The composite gasket material recited in claim 1 wherein the porous fluoropolymer film is expanded polytetrafluoroethylene film.

3. The composite gasket material recited in claim 2 wherein the expanded-graphite sheet has a density between 0.75 g/cc and 1.5 g/cc.

4. A composite gasket material comprising at least one layer of porous fluoropolymer film laminated to a subassembly comprising at least one layer of expanded-graphite sheet laminated to at least one layer of metal sheet.

5. The composite gasket material recited in claim 4 wherein the porous fluoropolymer film is expanded polytetrafluoroethylene film.

6. The composite gasket material recited in claim 5 wherein the expanded-graphite sheet has a density between 0.75 g/cc and 1.5 g/cc.

* * * * *